United States Patent
Homma et al.

(10) Patent No.: US 10,358,577 B2
(45) Date of Patent: Jul. 23, 2019

(54) ULTRAVIOLET-CURABLE RESIN COMPOSITION AND OPTICAL FIBER

(71) Applicant: SUMITOMO ELECTRIC INDUSTRIES, LTD., Osaka-shi, Osaka (JP)

(72) Inventors: Yuya Homma, Osaka (JP); Kazuyuki Sohma, Osaka (JP); Kensaku Shimada, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/170,449

(22) Filed: Oct. 25, 2018

(65) Prior Publication Data
US 2019/0127605 A1    May 2, 2019

(30) Foreign Application Priority Data
Oct. 26, 2017 (JP) ................. 2017-206930

(51) Int. Cl.
| C09D 175/14 | (2006.01) |
| C09B 55/00 | (2006.01) |
| C03C 25/326 | (2018.01) |
| C03C 25/1065 | (2018.01) |
| C09D 4/00 | (2006.01) |
| G02B 6/02 | (2006.01) |
| C03C 25/285 | (2018.01) |
| C08K 5/3432 | (2006.01) |

(52) U.S. Cl.
CPC ........ *C09D 175/14* (2013.01); *C03C 25/1065* (2013.01); *C03C 25/285* (2013.01); *C03C 25/326* (2013.01); *C09B 55/009* (2013.01); *C09D 4/00* (2013.01); *G02B 6/02395* (2013.01); *C08K 5/3432* (2013.01)

(58) Field of Classification Search
CPC ...... C09D 175/14; C09D 4/00; C09B 55/009; C03C 25/326; C03C 25/1065; C03C 25/285; G02B 6/02395; C08K 5/3432
See application file for complete search history.

(56) References Cited

U.S. PATENT DOCUMENTS 3,703,396 A * 11/1972 Lamanche ............ B05C 19/001
                                                156/158
2013/0243948 A1* 9/2013 Baker .................. C03C 25/1065
                                                427/162

FOREIGN PATENT DOCUMENTS

| JP | H04-357136 A | 12/1992 |
| JP | 2001-48598 A | 2/2001 |

* cited by examiner

*Primary Examiner* — Ryan A Lepisto
*Assistant Examiner* — Erin D Chiem
(74) *Attorney, Agent, or Firm* — Drinker Biddle & Reath LLP

(57) ABSTRACT

In an ultraviolet-curable resin composition for an optical fiber coating, the polarity parameter $E_T(30)$ of the resin composition is 47 to 61.

10 Claims, 1 Drawing Sheet

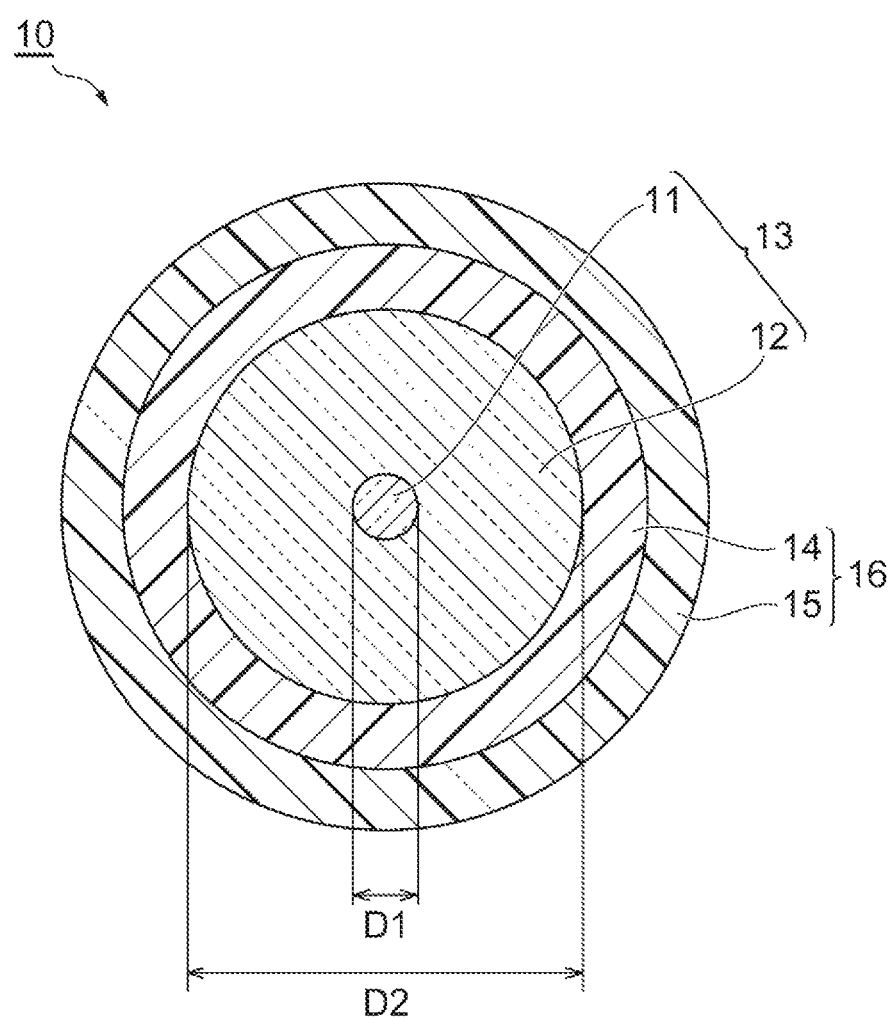

ULTRAVIOLET-CURABLE RESIN COMPOSITION AND OPTICAL FIBER

TECHNICAL FIELD

The present invention relates to an ultraviolet-curable resin composition and an optical fiber.

The present application claims the priority based on Japanese Patent No. 2017-206930 filed on Oct. 26, 2017, and the entire contents described in the Japanese Patent is incorporated by reference.

BACKGROUND

A glass fiber which is an optical transmission medium, is obtained by the fiber drawing of a preform containing silica glass as the main ingredient, and the periphery of the glass fiber consisting of a core and a cladding is provided with a coating resin layer for protecting the glass fiber to manufacture an optical fiber. The coating resin layer, for example, comprises two layers which are a primary resin layer and a secondary resin layer. The outermost layer of the coating resin layer may comprise a colored layer (ink layer) for distinguishing optical fibers.

The manufactured optical fiber passes along a pass line guided by rollers or capstan rollers, and is finally wound on a bobbin. Although the coating resin layer of an optical fiber has insulating properties, the fiber is charged by friction with a roller or the like, and repulsive force or attractive force may act between a bobbin and the fiber to cause irregular winding.

Discharging an optical fiber by disposing a static eliminator on a pass line to prevent irregular winding is described in JP H4-357136 A. Preventing charging at the time of winding after the formation of a colored layer by adjusting water absorption and the amount of the remaining double bonds of a colored layer in specific ranges is described in JP 2001-48598 A.

SUMMARY

When the amount of charge on a coating resin layer is large, electricity may be insufficiently discharged, resulting in winding abnormality.

An object of the present invention is to provide an ultraviolet-curable resin composition for an optical fiber coating, capable of suppressing the charging of an optical fiber and reducing the occurrence of winding abnormality at the time of winding.

The polarity parameter $E_T(30)$ of the ultraviolet-curable resin composition for an optical fiber coating according to one aspect of the present invention is 47 to 61.

According to the present invention, the charging of an optical fiber is suppressed, and the occurrence of winding abnormality at the time of winding is reduced.

BRIEF DESCRIPTION OF THE DRAWINGS

FIG. 1 is a schematic sectional view showing one example of an optical fiber according to the present embodiment.

DETAILED DESCRIPTION

Description of Embodiments of the Present Invention

First, the contents of embodiments of the present invention will be enumerated and described. The polarity parameter $E_T(30)$ of an ultraviolet-curable resin composition for an optical fiber coating according to one aspect of the present invention is 47 to 61.

The polarity parameter $E_T(30)$ can be determined by dissolving a betaine dye having a structure represented by the following formula (1) in a resin composition according to the present embodiment, measuring the maximal absorption wavelength λmax, and calculating according to the following expression:

$$E_T(30) = 28591/\lambda max \text{ [nm]}.$$

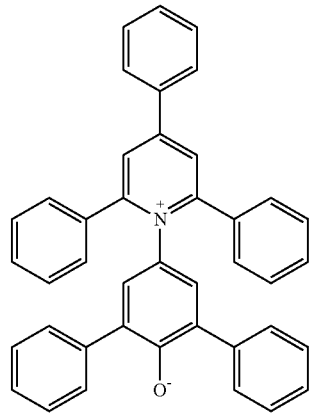

(1)

Herein, the compound represented by formula (1) is dissolved in the resin composition at a concentration of $10^{-4}$ mol/L, the absorption spectrum in the range of 450 to 950 nm is measured, and the maximal absorption wavelength at that time is defined as λmax. A higher value of the $E_T(30)$ indicates a higher polarity of the resin composition. The charging of the coating resin layer after curing can be further suppressed as the polarity of the resin composition becomes higher. The present inventors have found that the charging of the coating resin layer can be suppressed and the occurrence of winding abnormality can be reduced by using the resin composition having an $E_T(30)$ of 47 to 61. Since the use of the $E_T(30)$ allows determination of whether success or failure in the stage of a resin composition, the $E_T(30)$ is an effective parameter. When the $E_T(30)$ is less than 47, the occurrence frequency of winding abnormality is not acceptable, and when the $E_T(30)$ is more than 61, the polarity is too high and therefore the water resistance of the coating resin layer may be inferior.

The polarity parameter $E_T(30)$ may be 51 to 61. Therefore, the charging of the coating resin layer can be further suppressed, and the occurrence frequency of the winding abnormality can be further reduced.

The resin composition according to the present embodiment may contain a urethane (meth)acrylate oligomer, a monomer and a photopolymerization initiator. The monomer contains a nitrogen-containing monomer, and the content of the nitrogen-containing monomer may be 15% by mass or less based on the total amount of the resin composition. The value of $E_T(30)$ is easily adjusted by containing the above-mentioned monomer. The nitrogen-containing monomer may contain a heterocycle-containing (meth)acrylate or an N-substituted amide monomer.

An optical fiber according to one embodiment of the present invention comprises an optical transmission medium comprising a core and a cladding, a primary resin layer being in contact with the optical transmission medium and covering the optical transmission medium, and a secondary resin layer covering the primary resin layer, and the secondary resin layer is a cured product of the above-mentioned ultraviolet-curable resin composition. Charging on the surface of the optical fiber is suppressed and the occurrence of winding abnormality can be reduced by applying the resin composition according to the present embodiment to the secondary resin layer.

Details of Embodiments of the Present Invention

Specific examples of an ultraviolet-curable resin composition and an optical fiber according to an embodiment of the present invention will be described with reference to the drawing as necessary. The present invention is not limited to these illustrations, is shown by WHAT IS CLAIMED IS, and is intended to include all modifications in meanings and a scope equivalent to WHAT IS CLAIMED IS. In the following description, the same components are indicated with the same signs, and overlapping description is omitted in the description of the drawing.

(Ultraviolet-Curable Resin Composition)

A resin composition according to the present embodiment can contain a urethane (meth)acrylate oligomer, a monomer and a photopolymerization initiator.

Here, a (meth)acrylate means an acrylate or a methacrylate corresponding to it. The same applies to (meth)acrylic acid means acrylic acid or methacrylic acid.

Examples of the urethane (meth)acrylate oligomer include an oligomer obtained by reacting a polyol compound, a polyisocyanate compound and a hydroxyl group-containing (meth)acrylate compound.

Examples of the polyol compound include polytetramethylene glycol, polypropylene glycol and bisphenol A-ethylene oxide addition diol. Examples of the polyisocyanate compound include 2,4-tolylene diisocyanate, 2,6-tolylene diisocyanate, isophorone diisocyanate and dicyclohexylmethane-4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate and tripropylene glycol mono(meth)acrylate.

A catalyst may be used when a urethane (meth)acrylate oligomer is synthesized. Examples of the catalyst include dibutyltin dilaurate, dibutyltin diacetate, dibutyltin maleate, dibutyltin bis(2-ethylhexyl mercaptoacetate), dibutyltin bis(isooctyl mercaptoacetate) and dibutyltin oxide.

When the urethane (meth)acrylate oligomer is synthesized, a lower alcohol having 5 or less carbon atoms may be used. Examples of the lower alcohol having 5 or less carbon atoms include methanol, ethanol, 1-propanol, 2-propanol, 1-butanol, 2-butanol, 2-methyl 2-propanol, 1-pentanol, 2-pentanol, 3-pentanol, 2-methyl-1-butanol, 3-methyl-1-butanol, 2-methyl-2-butanol, 3-methyl-2-butanol and 2,2-dimethyl-1-propanol.

The preparation of the urethane (meth)acrylate oligomer will be described hereinafter by giving specific examples. For example, when polypropylene glycol as a polyol, isophorone diisocyanate as a polyisocyanate, 2-hydroxyethyl acrylate as a hydroxyl group-containing (meth)acrylate, and methanol as an alcohol are used, a urethane (meth)acrylate oligomer comprising three reaction products shown below can be obtained.

(1) H-I-(PPG-I)n-H
(2) H-I-(PPG-I)n-Me
(3) Me-I-(PPG-I)n-Me

Here, H represents a 2-hydroxyethyl acrylate residue, I represents an isophorone diisocyanate residue, PPG represents a polypropylene glycol residue, Me represents a methanol residue, and n represents an integer of 1 or more.

Since the reaction product (1) is a both-ends reactive oligomer, it can increase the crosslink density of a cured product. Since the reaction product (2) is a one-end reactive oligomer, it has an effect of reducing the crosslink density of a cured product and can reduce the Young's modulus. Since the reaction product (3) is a non-reactive oligomer and is not subjected to ultraviolet curing, it is preferable in preparation that its amount becomes as small as possible.

When a urethane (meth)acrylate oligomer is synthesized, a silane coupling agent having a functional group reacting with an isocyanate group may be used. Examples of the silane coupling agent having a functional group reacting with an isocyanate group include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-mercaptopropylmethyldimethoxysilane and 3-mercaptopropyltrimethoxysilane. A one-end silane coupling agent-added oligomer and a both-ends reactive oligomer can be synthesized by reacting the polyol compound and the isocyanate compound, thus obtaining the oligomer having isocyanate groups present on both ends, then reacting the hydroxyl group-containing (meth)acrylate compound and the silane coupling agent with the isocyanate groups. As a result, the oligomer can react with glass, and thus the adhesion to glass can be improved.

The content of the urethane (meth)acrylate oligomer may be 35 to 80% by mass, and is preferably 40 to 75% by mass, and more preferably 50 to 70% by mass based on the total amount of the resin composition from the viewpoint of suppressing the charging of the coating resin layer.

As the monomer, a monofunctional monomer having one polymerizable group and a polyfunctional monomer having two or more polymerizable groups can be used. Two or more monomers may be used as a mixture.

The monomer may contain one or more nitrogen-containing monomers, since the nitrogen-containing monomer has an effect of increasing the value of $E_T(30)$ and makes adjustment of the polarity easier. The content of the nitrogen-containing monomer may be 15% by mass or less, and preferably 1 to 15% by mass, more preferably 1 to 10% by mass, and still more preferably 2 to 10% by mass based on the total amount of the resin composition from the viewpoint of water proofing.

Examples of the nitrogen-containing monomer include heterocycle-containing (meth)acrylates such as N-acryloylmorpholine, N-vinylpyrrolidone, N-vinylcaprolactam, N-acryloylpiperidine, N-methacryloylpiperidine, N-acryloylpyrrolidine and 3-(3-pyridinyl)propyl (meth)acrylate; maleimide monomers such as maleimide, N-cyclohexylmaleimide and N-phenylmaleimide; N-substituted amide monomers such as (meth)acrylamide, N,N-dimethyl(meth)acrylamide, N,N-diethyl(meth)acrylamide, N,N-dimethylaminopropylacrylamide, methyl chloride salt of N,N-dimethylaminopropylacrylamide, N-hexyl(meth)acrylamide, N-hydroxyethylacrylamide, diacetone acrylamide, N-methyl(meth)acrylamide, N-isopropyl(meth)acrylamide, N-butyl(meth)acrylamide, N-methylol(meth)acrylamide and N-methylolpropane(meth)acrylamide; aminoalkyl (meth)acrylate monomers such as aminoethyl (meth)acrylate, aminopropyl (meth)acrylate, N,N-dimethylaminoethyl (meth)acrylate and tert-butylaminoethyl (meth)acrylate;

succinimide monomers such as N-(meth)acryloyloxymethylenesuccinimide, N-(meth)acryloyl-6-oxyhexamethylenesuccinimide and N-(meth)acryloyl-8-oxyoctamethylenesuccinimide. It is preferable that the nitrogen-containing monomer contain a heterocycle-containing (meth)acrylate or N-substituted amide monomer from the viewpoint of further suppressing the charging of the coating resin layer.

The monomer may contain a monofunctional monomer other than the nitrogen-containing monomer. Examples of the monofunctional monomer include methyl (meth)acrylate, ethyl (meth)acrylate, propyl (meth)acrylate, normal butyl (meth)acrylate, sec-butyl (meth)acrylate, tert-butyl (meth)acrylate, isobutyl (meth)acrylate, normal pentyl (meth)acrylate, isopentyl (meth)acrylate, hexyl (meth)acrylate, heptyl (meth)acrylate, isoamyl (meth)acrylate, 2-ethylhexyl (meth)acrylate, normal octyl (meth)acrylate, isooctyl (meth)acrylate, isodecyl (meth)acrylate, lauryl (meth)acrylate, phenoxyethyl (meth)acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenoxy polyethylene glycol (meth)acrylate, isobornyl (meth)acrylate, (meth)acrylic acid, a (meth)acrylic acid dimer, carboxyethyl (meth)acrylate, carboxypentyl (meth)acrylate, ω-carboxy-polycaprolactone (meth)acrylate, 2-hydroxyethyl (meth)acrylate, 2-hydroxybutyl (meth)acrylate, 1,6-hexanediol mono(meth)acrylate and 2-hydroxypropyl (meth)acrylate.

Examples of the polyfunctional monomer include ethylene glycol di(meth)acrylate, polyethylene glycol di(meth)acrylate, polypropylene glycol di(meth)acrylate, neopentyl glycol di(meth)acrylate, tripropylene glycol di(meth)acrylate, bisphenol A alkylene oxide adduct di(meth)acrylate, bisphenol A diglycidyl ether acrylic acid adduct di(meth)acrylate, tetraethylene glycol di(meth)acrylate, hydroxypivalate neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyldiol di(meth)acrylate, 3-ethyl-1,8-octanediol di(meth)acrylate, bisphenol A EO adduct di(meth)acrylate, trimethylolpropane tri(meth)acrylate, trimethyloloctane tri(meth)acrylate, trimethylolpropane polyethoxy tri(meth)acrylate, trimethylolpropane polypropoxy tri(meth)acrylate, trimethylolpropane polyethoxy polypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, and caprolactone-modified tris[(meth)acryloyloxyethyl]isocyanurate.

The photopolymerization initiator can be properly selected from well-known radical photopolymerization initiators and used. Examples of the photopolymerization initiator include 1-hydroxycyclohexyl phenyl ketone, 2,2-dimethoxy-2-phenyl acetophenone, 1-(4-isopropylphenyl)-2-hydroxy-2-methylpropan-1-one, bis(2,6-dimethoxybenzoyl)-2,4,4-trimethylpentylphosphine oxide, 2-methyl-1-[4-(methylthio)phenyl]-2-morpholino-propan-1-one (Irgacure 907, produced by BASF Corp.), 2,4,6-trimethylbenzoyl diphenyl phosphine oxide (Irgacure TPO, produced by BASF Corp.) and bis(2,4,6-trimethylbenzoyl) phenylphosphine oxide (Irgacure 819, produced by BASF Corp.). Although two or more photopolymerization initiators may be used as a mixture, it is preferable that 2,4,6-trimethylbenzoyl diphenyl phosphine oxide is contained.

The resin composition according to the present embodiment may further contain a silane coupling agent, a photoacid generator, a leveling agent, an antifoaming agent, an antioxidant and the like.

The silane coupling agent is not particularly limited as long as it does not prevent the curing of the ultraviolet-curable resin composition, and all silane coupling agents including well-known and commonly used silane coupling agents can be used. Examples of the silane coupling agent include tetramethyl silicate, tetraethyl silicate, mercaptopropyltrimethoxysilane, vinyltrichlorosilane, vinyltriethoxysilane, vinyl tris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyl tetrasulfide and γ-trimethoxysilylpropylbenzothiazyl tetrasulfide. The adhesion to glass can be adjusted or the dynamic fatigue properties can be improved by using the silane coupling agent.

An onium salt having the structure of $A^+B^-$ may be used as the photoacid generator. Examples of the photoacid generator include sulfonium salts such as UVACURE1590 (produced by DAICEL CYTEC Co., Ltd.), CPI-100P and 110P (produced by San-Apro Ltd.), and iodonium salts such as IRGACURE 250 (produced by BASF Corp.), WPI-113 (produced by Wako Pure Chemical Industries, Ltd.) and Rp-2074 (produced by Rhodia Japan Corp.).

(Optical Fiber)

FIG. 1 is a schematic sectional view showing one example of an optical fiber according to one embodiment of the present invention.

An optical fiber 1 comprises: an optical transmission medium 13 comprising a core 11 and a cladding 12; and a coating resin layer 16 comprising a primary resin layer 14 provided on the outer periphery of the optical transmission medium 13 and a secondary resin layer 15.

The cladding 12 surrounds the core 11. The core 11 and the cladding 12 mainly contains glass such as silica glass, for example, germanium-added silica can be used for the core 11, and pure silica or fluoride-added silica can be used for the cladding 12.

In FIG. 1, for example, the outer diameter (D2) of the optical transmission medium 13 is around 125 µm. The diameter (D1) of the core 11 constituting the optical transmission medium 13 is around 7 to 15 µm. The coating resin layer 16 has the structure of at least two layers comprising the primary resin layer 14 and the secondary resin layer 15. The total thickness of the coating resin layer 16 is usually around 60 µm, and the thicknesses of the primary resin layer 14 and the secondary resin layer 15 are almost the same and 20 to 40 µm, respectively. For example, the thickness of the primary resin layer 14 may be 35 µm and the thickness of the secondary resin layer 15 may be 25 µm.

The Young's modulus of the primary resin layer may be 1.0 MPa or less at 23° C. from the viewpoint that the transmission loss by microbend is reduced. The Young's modulus of the secondary resin layer may be 500 to 2500 MPa at 23° C. When the Young's modulus of a secondary resin layer is 500 MPa or more, the lateral pressure resistance is easily improved, and when it is 2500 MPa or less, destruction hardly occurs at the time of removing the coating due to having moderate breaking extension, and is excellent in coating removability.

The primary resin layer 14 and the secondary resin layer 15 can be formed by curing the ultraviolet-curable resin composition containing the urethane (meth)acrylate oligomer, the monomer and the photopolymerization initiator. The urethane (meth)acrylate oligomer, the monomer and the photopolymerization initiator may be properly selected from those mentioned above.

The ultraviolet-curable resin composition according to the present embodiment can be applied to the secondary resin layer. When the $E_T(30)$ of the resin composition for the secondary resin layers is in the range of 47 to 61, charging on the surface of the optical fiber is suppressed and the occurrence of the winding abnormality is reduced. The $E_T(30)$ of the resin composition is preferably 51 to 61, and more preferably 53 to 61 from the viewpoint of further suppressing charging on the surface of optical fiber and further reducing the occurrence of winding abnormality.

The ultraviolet-curable resin composition according to the present embodiment may be applied to the primary resin layer. However, a resin composition for the primary resin layer has a composition different from that of a resin composition for the secondary resin layer.

EXAMPLES

The present invention will be described still more specifically hereinafter by showing the results of evaluation tests using Examples and Comparative Examples according to the present invention. The present invention is not limited to these Examples.

(Urethane Acrylate Oligomer)

Polypropylene glycol having a molecular weight of 4000 was used as the polyol, isophorone diisocyanate was used as the polyisocyanate, 2-hydroxyethyl acrylate was used as the hydroxyl group-containing (meth)acrylate, and dibutyltin diacetate was used as the catalyst.

A polyol, a polyisocyanate and a hydroxyl group-containing (meth)acrylate were placed so that the molar ratio of the OH groups of the polyol:the NCO groups of the polyisocyanate:the OH groups of the hydroxyl group-containing (meth)acrylate was 2:3:2.1, and a catalyst was added at 200 ppm based on the total amount of the oligomer to prepare a urethane acrylate oligomer A.

Polypropylene glycol having a molecular weight of 1000 was used as the polyol, isophorone diisocyanate was used as the polyisocyanate, 2-hydroxyethyl acrylate was used as the hydroxyl group-containing (meth)acrylate, and dibutyltin dilaurate was used as the catalyst.

A polyol, a polyisocyanate and a hydroxyl group-containing (meth)acrylate were placed so that the molar ratio of the OH groups of the polyol:the NCO groups of the polyisocyanate:the OH groups of the hydroxyl group-containing (meth)acrylate was 1:2:2.1, and a catalyst was added at 200 ppm based on the total amount of the oligomer to prepare a urethane acrylate oligomer B.

[Production of Ultraviolet-Curable Resin Composition]
(Resin Composition for Primary Resin Layer)

First, 60 parts by mass of the urethane acrylate oligomer A as the oligomer, 12 parts by mass of isobornyl acrylate, 10 parts by mass of N-vinyl caprolactam and 16 parts by mass of phenoxyethyl acrylate as the monomer, and 2 parts by mass of Irgacure TPO as the photopolymerization initiator were mixed to prepare a resin composition for a primary resin layer.

(Resin Composition for Secondary Resin Layer)

Resin compositions for secondary resin layers having compositions (part by mass) shown in Table 1 and 2 were prepared, respectively. In the tables, "Viscoat #700" is a trade name of bisphenol A EO adduct diacrylate produced by Osaka Organic Chemical Industry Ltd.

(Polarity Parameter)

The betaine dye having the structure represented by a formula (1) was dissolved in a resin composition for a secondary resin layer at a concentration of $10^{-4}$ mol/L, and the maximal absorption wavelength λmax of an absorption spectrum in the range of 450 to 950 nm was measured using an ultraviolet visible light spectrophotometer "UV-1800" manufactured by SHIMADZU CORPORATION. Subsequently, $E_T(30)$ was calculated from λmax and the following expression. The results are shown in Tables 1 and 2.

$$E_T(30)=28591/\lambda max \text{ [nm]}$$

[Production of Optical Fiber 10]

A coating resin layer 16 was formed on the outer periphery of an optical transmission medium 13 comprising a core and a cladding and having an outer diameter of 125 μm using the above-mentioned resin composition for a primary resin layers and a resin composition for a secondary resin layer having a composition shown in Table 1 or 2 to manufacture an optical fiber 10, and the optical fiber was wound around a bobbin. The thickness of the primary resin layer 14 was adjusted to 35 μm and the thickness of secondary resin layer 15 was adjusted to 25 μm.

[Evaluation of Optical Fiber 10]

The following evaluation tests were performed on the manufactured optical fibers. The results are shown in Tables 1 and 2.

(Measurement of Amount of Charging)

An optical fiber was rewound at a linear velocity 1000 m/min, and the amount of the optical fiber charged directly after rewinding was measured using a static electricity measuring instrument "FMX-003" manufactured by SIMCO JAPAN Inc. The distance between the optical fiber and the measuring instrument was set to be 25 mm. An optical fiber having an absolute value of the amount of charging less than 0.5 kV was evaluated as "A", an optical fiber having the value of 0.5 to 1.5 kV was evaluated as "B", an optical fiber having the value more than 1.5 kV was evaluated as "C", and an optical fiber having an absolute value of the amount of charging of 1.5 kV or less was determined as acceptable.

(Winding Abnormality Frequency)

500 km of the optical fiber was rewound (50 km×10 bobbins) at a linear velocity 1000 m/min, and transmission loss in the longitudinal direction of each bobbin was evaluated using an OTDR (optical time domain reflectometer). The measurement wavelength was set as 1550 nm. An optical fiber having 2 or less points where the Point Discontinuities exceed 0.05 dB (winding abnormality frequency)/500 km was evaluated as "A", an optical fiber having 3 to 5 points/500 km was evaluated as "B", an optical fiber having 6 or more points/500 km was evaluated as "C", and an optical fiber passed having a winding abnormality frequency of 5 points or less/500 km was determined as acceptable.

TABLE 1

| | Example | | | | | | | |
|---|---|---|---|---|---|---|---|---|
| | 1 | 2 | 3 | 4 | 5 | 6 | 7 | 8 |
| Urethane acrylate oligomer B | 60 | 60 | 60 | 60 | 60 | 60 | 60 | 40 |
| Isobornyl acrylate | 14 | 19 | 20 | 15 | 15 | 18 | 20 | 20 |
| N,N-Diethyl-acrylamide | 10 | 5 | 1 | — | — | — | — | — |
| N-Hydroxy-ethyl-acrylamide | — | — | — | 5 | — | — | — | — |
| N-Acryloyl-morpholine | — | — | — | — | 5 | — | — | — |
| Methyl chloride Salt of N,N-dimethyl-aminopropyl-acrylamide | — | — | — | — | — | 2 | — | — |
| Isodecyl acrylate | — | — | — | — | — | — | — | 5 |
| Viscoat #700 | 14 | 14 | 17 | 18 | 18 | 18 | 18 | 18 |
| Trimethylol-propane triacrylate | — | — | — | — | — | — | — | 15 |
| Irgacure 184 | 1 | 1 | 1 | 1 | 1 | 1 | 1 | 1 |
| Irgacure TPO | 1 | 1 | 1 | 1 | 1 | 1 | 1 | 1 |
| $E_T(30)$ | 57 | 55 | 51 | 61 | 58 | 58 | 50 | 47 |
| Amount of charging (kV) | 0.1 | 0.2 | 0.5 | 0.1 | 0.1 | 0.1 | 0.7 | 1.4 |
| | A | A | A | A | A | A | B | B |
| Winding abnormality frequency (point/500 km) | 0 | 1 | 2 | 0 | 0 | 0 | 3 | 5 |
| | A | A | A | A | A | A | B | B |

TABLE 2

| Comparative Example | 1 | 2 |
|---|---|---|
| Urethane acrylate oligomer B | 30 | 20 |
| Isobornyl acrylate | 20 | 20 |
| Isodecyl acrylate | 10 | 15 |
| Viscoat #700 | 14 | 14 |
| Trimethylolpropane triacrylate | 24 | 29 |
| Irgacure 184 | 1 | 1 |
| Irgacure TPO | 1 | 1 |
| $E_T(30)$ | 45 | 42 |
| Amount of charging (kV) | 1.6 | 2.0 |
| | C | C |
| Winding abnormality frequency (point/500 km) | 8 | 13 |
| | C | C |

What is claimed is:

1. An ultraviolet-curable resin composition for an optical fiber coating, wherein a polarity parameter $E_T(30)$ of the resin composition is 47 to 61, wherein the polarity parameter $E_T(30)$ is determined by dissolving a betaine dye having a structure represented by a following formula (1) in the resin composition, measuring a maximal absorption wavelength λmax, and calculating according to the following expression:

$$E_T(30)=28591/\lambda max \text{ [nm]}$$

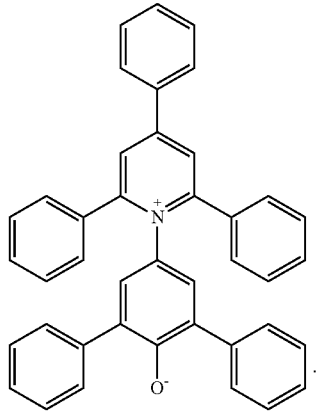

(1)

2. The ultraviolet-curable resin composition according to claim 1, wherein the polarity parameter $E_T(30)$ is 51 to 61.

3. The ultraviolet-curable resin composition according to claim 1, comprising a urethane (meth)acrylate oligomer, a monomer, and a photopolymerization initiator.

4. The ultraviolet-curable resin composition according to claim 3, wherein the monomer comprises a nitrogen-containing monomer, and a content of the nitrogen-containing monomer is 15% by mass or less based on a total amount of the resin composition.

5. The ultraviolet-curable resin composition according to claim 4, wherein the nitrogen-containing monomer comprises a heterocycle-containing (meth)acrylate or an N-substituted amide monomer.

6. An optical fiber comprising:
   an optical transmission medium comprising a core and a cladding;
   a primary resin layer being in contact with the optical transmission medium and covering the optical transmission medium; and
   a secondary resin layer covering the primary resin layer, wherein the secondary resin layer is a cured product of the ultraviolet-curable resin composition according to claim 1.

7. The optical fiber according to claim 6, wherein the polarity parameter $E_T(30)$ is 51 to 61.

8. The optical fiber according to claim 6, wherein the ultraviolet-curable resin composition comprises a urethane (meth)acrylate oligomer, a monomer, and a photopolymerization initiator.

9. The optical fiber according to claim 8, wherein the monomer comprises a nitrogen-containing monomer, and a content of the nitrogen-containing monomer is 15% by mass or less based on a total amount of the resin composition.

10. The optical fiber according to claim 9, wherein the nitrogen-containing monomer comprises a heterocycle-containing (meth)acrylate or an N-substituted amide monomer.

* * * * *